Figure 1:
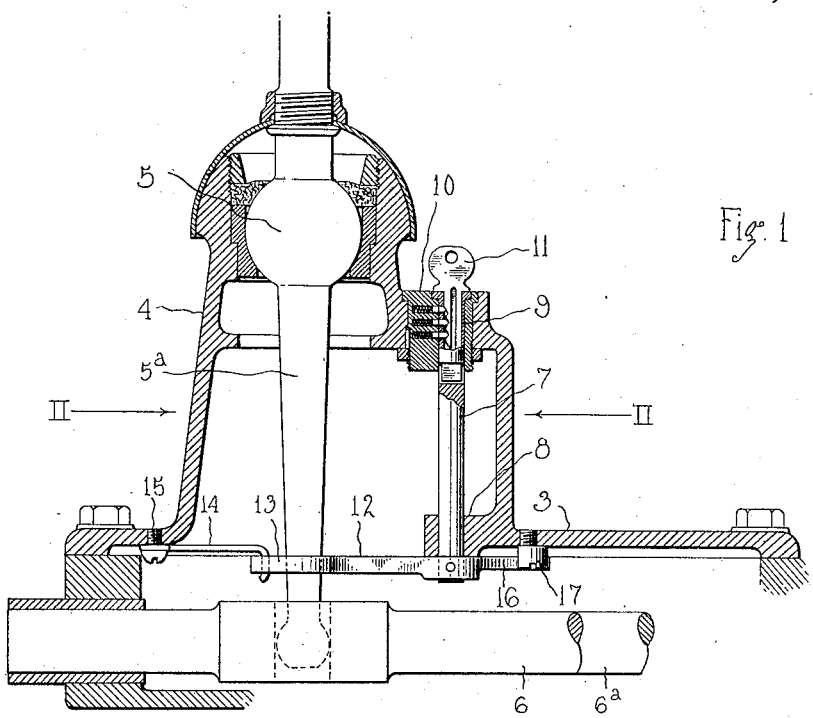

E. W. SEAHOLM.
GEAR SHIFT LEVER LOCK.
APPLICATION FILED JUNE 13, 1919.

1,406,231.

Patented Feb. 14, 1922.

Inventor
Ernest W. Seaholm
By his Attorney
Lloyd Blackmore

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

GEAR-SHIFT-LEVER LOCK.

1,406,231.   Specification of Letters Patent.   Patented Feb. 14, 1922.

Application filed June 13, 1919. Serial No. 303,989.

*To all whom it may concern:*

Be it known that I, ERNEST W. SEAHOLM, a citizen of the United States, and resident of Detroit, Wayne County, State of Michigan, have invented certain new and useful Improvements in Gear-Shift-Lever Locks, of which the following is a specification.

My invention relates to locking devices for use in connection with automobiles to prevent unauthorized persons from operating the same, and particularly to locking devices of the type or class commonly referred to as transmission locks and in which the lever whereby the transmission gearing of the automobile is operated is locked in a definite position; such locking mechanisms being ordinarily so arranged as to lock the gear shifting lever in a neutral position, so that the vehicle cannot be driven from the engine while the lever in question is locked in the position referred to.

The object of my invention is to provide transmission locking mechanism of the type above referred to which will be more simple in construction and effective for the purposes for which it is designed than has heretofore commonly been the case, and which may be readily applied to types of transmission gearing casing at present in use without material change in the design or construction thereof.

My improved transmission lock is illustrated in its preferred form in the drawing accompanying and forming a part of this specification, although it will be appreciated that various modifications may be made in the particular form thereof illustrated without departing from my invention so long as such changes come within the scope of the concluding claims.

Figure 2:
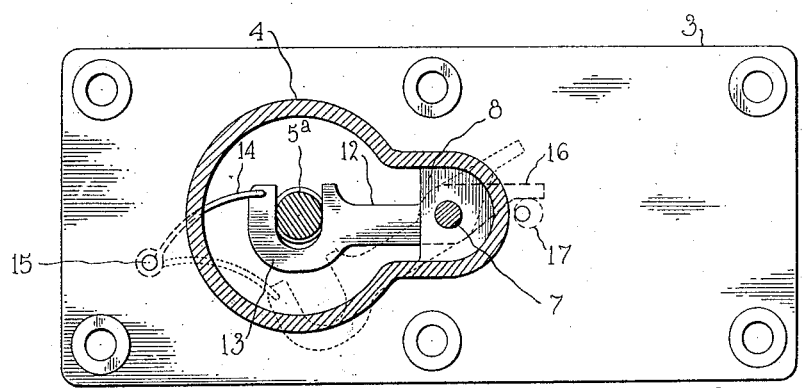

Referring to the drawing:

Figure 1 is a view showing my improved transmission locking device as applied to transmission gearing shown conventionally, the view being upon a vertical central plane, and Figure 2 is a view showing a section upon a horizontal plane indicated by the line II—II Fig. 1

Referring to the drawing, the reference numeral 3 designates the cover of a transmission gear casing, the casing itself and the gears within the same not being shown, as my invention is in no way concerned with the details of construction of the transmission gearing.

The cover 3 is provided with an upwardly extending dome 4 having a spherical seat at its upper end within which a spherical enlargement 5 of an oscillating gear shifting lever $5^a$ is supported, thus providing a construction in which the gear shifting lever may be moved in one direction to cause its lower end to engage one or the other of two longitudinal movable gear shifting rods 6, $6^a$, and in another direction to impart longitudinal movement to said rods. These rods are operatively connected with suitable change speed gears which form a part of the transmission gearing, as will be appreciated, although the gears themselves are not shown.

The reference numeral 7 designates an oscillating shaft the lower end of which is supported in a bearing 8 carried by the casing cover 3, and the upper end of which is operatively connected with a barrel 9 of a cylindrical lock; the casing 10 of this lock being supported in an opening provided in the wall of the cover 3 above the bearing 8. The barrel 9 and casing 10, in connection with suitable pins, constitute an ordinary type of lock; and it will be appreciated that upon the insertion of the key 11 the pins or tumblers will be moved into positions such that the casing 10 may be rotated, and angular motion communicated to the oscillating shaft 7.

Secured to the lower end of the shaft 7 is an oscillating locking member 12 which is movable into and out of locking engagement with the lower end of the gear shifting lever $5^a$ to thereby prevent movement of said lever when said locking member is in its locking position. The locking member 12 in the form of my invention illustrated is provided with a recess adjacent its free end, as best shown in Fig. 2, whereby a yoke 13 is provided; which yoke embraces the gear shifting lever $5^a$ and prevents it from being moved when the locking member is in the locking position in which it is shown in Figure 2.

The reference numeral 14 designates a spring secured to the inside of the cover 3 through a pivotal connection provided by a screw 15, and the free end of which spring is operatively connected with the oscillating locking member 12 adjacent the free end of said locking member. The spring 14 is normally flexed and under compression, from which it follows that the spring will hold the locking member 12 in the locking position in which it is shown in Figure 2 when the gear shifting lever is locked. In unlocking the lever the initial movement imparted to the locking member through the shaft 7 will place the spring under further tension, and, as the point of connection between the free ends of the spring and the locking member passes the center line extending between the screw 15 and the axis of the shaft 7, the tension of the spring will force the locking member into the extreme position in which it is shown in dotted lines in Fig. 2 and hold the same in the unlocked position shown in dotted lines in said figure.

The oscillating locking member 12 is provided with an arm 16 which engages an adjustable stop 17 upon the underside of the cover 3 to thereby provide a construction in which the co-operating pins of the locking members 9 and 10 may be made to register properly with one another when the spring 14 is acting to hold the locking member 12 in its locking position; so that the key may be readily inserted to accomplish the unlocking of the barrel 9 from the casing 10, and so that when the key is removed the springs acting upon the pins or tumblers of the lock will move the free ends of the parts thereof within the casing across the bearing surface between the casing and the barrel to thereby lock the barrel in place.

Having thus described and explained my invention, I claim and desire to secure by Letters Patent:

1. In a device of the class described, a gear shifting lever, a movable locking member therefor, resilient means for holding said member in both its extreme positions and means for operating said locking member, substantially as shown and described.

2. In a transmission lock of the class described and in combination with an oscillating gear shifting lever, an oscillating shaft; an oscillating locking member carried by said shaft and movable into and out of locking engagement with said gear shifting lever; a spring operatively connected with said locking member and adapted to hold the same in both its extreme positions; and locking mechanism comprising a casing, a barrel angularly movable in an opening provided in said casing and which barrel is operatively connected with and through which motion is communicated to said oscillating shaft, and means for locking said barrel and casing together.

3. In a transmission lock of the class described and in combination with an oscillating gear shifting lever, an oscillating locking member having a yoke movable into and out of locking engagement with said gear shifting lever; a spring operatively connected with the free end of said locking member and adapted to hold the same in both its extreme positions; an oscillating shaft whereby said locking member is carried; and locking mechanism associated with and adapted to lock said shaft in a position such that the yoke thereof will engage said gear shifting lever and through which locking mechanism oscillatory movement is communicated to said oscillating shaft.

4. In a transmission lock of the class described and in combination with a gear casing cover, and an oscillating gear shifting lever supported by said cover; an oscillating locking member supported by said cover and movable in and out of locking engagement with said gear shifting lever; a spring carried by said cover and operatively connected with said locking member adjacent the free end thereof, and which spring is adapted to hold said locking member in its extreme positions; an oscillating shaft supported by said cover and to which said locking member is secured; and locking means secured in place in an opening provided in said cover and which locking means is operatively connected with said oscillating shaft to operate the same, and to lock the same in position such that said locking member will engage said gear shifting lever and prevent movement thereof.

5. In a device of the class described, a gear shifting lever, an oscillating member for locking said lever in neutral position, resilient means for holding said member in both its locked and unlocked positions and combined operating and locking mechanism for said member, substantially as shown and described.

6. In a transmission lock of the class described and in combination with a movable gear shifting lever, a locking member movable into and out of locking engagement with said lever; spring mechanism for yieldably holding said locking member in both its extreme positions; and combined operating and locking mechanism through which movement is imparted to said locking member to move the same into locking engagement with said lever and whereby said locking member may be locked in position such that movement of said gear shifting lever is prevented.

In testimony whereof I affix my signature.

ERNEST W. SEAHOLM.